US012384010B2

(12) United States Patent
Wierer et al.

(10) Patent No.: US 12,384,010 B2
(45) Date of Patent: Aug. 12, 2025

(54) POWER TOOL AND METHOD FOR OPERATING A POWER TOOL

(71) Applicant: Hilti Aktiengesellschaft, Schaan (LI)

(72) Inventors: Michael Wierer, Roethis (AT); Manuel Gut, Goefis (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/560,789

(22) PCT Filed: May 24, 2022

(86) PCT No.: PCT/EP2022/064018
§ 371 (c)(1),
(2) Date: Nov. 14, 2023

(87) PCT Pub. No.: WO2022/258362
PCT Pub. Date: Dec. 15, 2022

(65) Prior Publication Data

US 2024/0278407 A1 Aug. 22, 2024

(30) Foreign Application Priority Data

Jun. 9, 2021 (EP) .................................... 21178467

(51) Int. Cl.
*B25F 5/00* (2006.01)

(52) U.S. Cl.
CPC .................................... *B25F 5/001* (2013.01)

(58) Field of Classification Search
CPC ....................................................... B25F 5/001
See application file for complete search history.

(56) References Cited

U.S. PATENT DOCUMENTS 3,714,994 A 2/1973 Zoerner et al.
6,009,775 A 1/2000 Thompson et al.
(Continued)

FOREIGN PATENT DOCUMENTS

EP 3753396 A1 12/2020
JP S4864600 A 9/1973
(Continued)

OTHER PUBLICATIONS

Milwaukee 2021 Catalog (Year: 2121).*
International Search Report PCT/EP2022/064018 dated Sep. 5, 2022.

*Primary Examiner* — Daniel Jeremy Leeds
(74) *Attorney, Agent, or Firm* — Davidson Kappel LLC

(57) ABSTRACT

A power tool having a tool and a motor, with the motor of the power tool being operated in a speed range from 2,000 to 30,000 rpm and with an inertia of the motor lying in a range from $20 \cdot 10^{-6}$ to $750 \cdot 10^{-6}$ kg·m$^2$. In a second aspect, the invention relates to a method for operating a power tool which is operated in a speed range from 2,000 to 30,000 rpm, with an inertia of the motor lying in a range from $20 \cdot 10^{-6}$ to $750 \cdot 10^{-6}$ kg·m$^2$. By selecting and specifying a set of parameters which describe characteristics of the motor of the power tool, the power tool can be designed and operated in such a way that a mechanical slip clutch can be dispensed with. The motor parameters "speed" and "inertia" are selected in particular so that a maximum torque in a transmission of the power tool is always below a specified upper limit.

15 Claims, 2 Drawing Sheets

(56) References Cited

U.S. PATENT DOCUMENTS

| | | | | |
|---|---|---|---|---|
| 2009/0009113 | A1* | 1/2009 | Rodriguez | H02P 6/085 318/400.15 |
| 2013/0105186 | A1* | 5/2013 | Pedersen | B25F 5/001 173/1 |

FOREIGN PATENT DOCUMENTS

| | | | |
|---|---|---|---|
| JP | 2008213087 | A | 9/2008 |
| JP | 2011251354 | A | 12/2011 |
| WO | WO 2011122695 | A1 | 10/2011 |
| WO | WO 2021084315 | A1 | 5/2021 |

* cited by examiner

POWER TOOL AND METHOD FOR OPERATING A POWER TOOL

The invention relates to a power tool having a tool and a motor, and to a method for operating a power tool.

BACKGROUND OF THE INVENTION

In the prior art, power tools are known with which different types of work can be carried out. For example, hammer drills, chisels, cut-off or angle grinders, screwdrivers or core drills are known in each of which a tool is driven by a motor. A power supply can be provided via a mains connection or with batteries or accumulators.

SUMMARY OF THE INVENTION

With devices which are known from the prior art, it is sometimes intended to attempt to limit a maximum torque in the drive train when the device or its tool is blocked. This is in particular to protect the user of the device and to prevent the user's arm, shoulder or wrist from being injured when the device continues to rotate in the event of blocking of its tool. Up to now, mechanical slip clutches have been used in order to bring about such a limitation of the maximum torque and of the deflection of the power tool and to protect the user of the power tool from excessive loads. However, such mechanical slip clutches are cost-intensive. In addition, mechanical slip clutches are maintenance-intensive and require short service intervals. Furthermore, high tripping speeds are observed with some slip clutches, which can have an adverse effect on productivity when working with the power tool.

To protect the user, mechatronic solutions have therefore been proposed in the prior art, with which in particular the reaction of the device to the user can be limited. However, there are no satisfactory solutions for limiting the short-term peak torques which occur in the drive train when the power tool or its tool is blocked. As a result, power tools currently on the market and in particular their mechanical components must be designed to be very robust in order to withstand the extreme loads which can occur with the torque peaks in the event of a blockage or jamming of the tool. The mechanics of such conventional power tools as are known from the prior art are therefore oversized for the majority of applications. Torque peaks of this kind can be extraordinarily high, particularly in the case of core drills with which cylindrical drill cores can be cut out of a substrate. This is due in particular to the torsional rigidity of the drill bit, which is the tool of a core drill.

An object of the present invention is therefore to overcome the above-described deficiencies and disadvantages of the prior art and to provide an improved power tool and a method for operating a power tool in which it is possible to limit the torque peak if the tool is blocked or jammed. It is a further concern of the invention that the power tool should manage without a mechanical slip clutch, and no compromises should be made in terms of protecting the user of the power tool. In addition, a compact and lightweight power tool is to be made available which enables convenient handling and is particularly low-maintenance.

In a first aspect, the object is achieved by a power tool having a tool and a motor, wherein the motor can be operated in a speed range from 2,000 to 30,000 rpm, with an inertia of the motor lying in a range from $20 \cdot 10^{-6}$ to $750 \cdot 10^{-6}$ $kg \cdot m^2$. The abbreviation rpm stands for the unit rounds per minutes, i.e. for the number of revolutions per minute. The inventors have recognized that the level of the torque peaks which occur if the tool of the power tool jams or blocks depends on the inertia conditions within the power tool. The invention is based on the idea that a level of the maximum torque can be set and limited by skillfully selecting motor parameters such that the maximum torque does not exceed a predetermined upper limit value. It is preferred within the meaning of the invention that the upper limit value represents a maximum value for the torque which can be achieved by the power tool or its motor. In this case, the maximum torque in the drive train of the power tool is reached in particular when the tool of the power tool is jammed or blocked. The high torque values that then occur are preferably referred to as "torque peaks" within the meaning of the invention. In particular, the inventors have recognized that the maximum torque depends on the inertia ratios between the power tool and its motor, as well as on the blocking speed of the tool and on the rigidity in the drive train of the power tool. It is a basic idea of the invention that the maximum torque that occurs can be limited and kept below an upper limit value if the power tool is operated in a range of the motor speed from 2,000 to 30,000 rpm and the inertia of the motor of the power tool lies in a range from $20 \cdot 10^{-6}$ to $750 \cdot 10^{-6}$ $kg \cdot m^2$.

The invention consists in particular in specifying the stated parameter ranges of motor speed and motor inertia, so that the maximum torque of the motor of the power tool always remains below a specified upper limit. This makes it possible for the user of the power tool to operate the power tool in a particularly safe manner. The time in which a jammed or blocked tool of a power tool comes to a standstill is usually very short. The corresponding time period can lie in the range of 5 milliseconds (ms), for example. After the blocking event, the power tool preferably continues to rotate at a predetermined initial speed. This movement is perceived by the user of the power tool as a deflection of the power tool. Tests have shown that this deflection of the power tool, which in the past has often led to injuries in the arm, shoulder and hand region of a user, can be significantly reduced with the invention.

The power tool can in particular be a core drill. The tool of the power tool is then preferably designed as a drill bit. The drill bit is used to cut out cylindrical drill cores from a solid substrate. However, the power tool can also be, for example, a hammer drill or drill driver.

In particular, in the context of the invention, a range for the motor inertia is described which enables slip clutch-free operation of the power tool in the speed range that is also specified. Thus, thanks to the invention, a mechanical slip clutch can be dispensed with, so that the power tool can be manufactured more cost-effectively and designed to be more compact. This advantageously leads to particularly convenient and simplified handling of the power tool. In particular, by operating the power tool in the motor speed range from 2,000 to 30,000 rpm and in the inertia range from $20 \cdot 10^{-6}$ to $750 \cdot 10^{-6}$ $kg \cdot m^2$, a productivity-enhanced and low-maintenance power tool with longer service intervals can be provided.

It is preferred within the meaning of the invention that the term motor inertia is understood as the mass moment of inertia of the motor, in particular as the mass moment of inertia of the rotating components of the motor about the axis of rotation of the motor shaft. The rotating components of the motor, which preferably rotate about the axis of rotation of the motor shaft, are preferably the rotor of the motor. Analogously, within the meaning of the invention, the term "inertia of the power tool" is preferably understood as the mass moment of inertia of the power tool, with the rotating components of the power tool preferably rotating about the axis of rotation of the tool.

It is preferred within the meaning of the invention that the upper limit for the torque is in a range from 500 to 1,500 Nm, preferably in a range from 700 to 1,200 Nm, particularly preferably in a range from 850 to 950 Nm and most preferably 900 Nm. It is preferred within the meaning of the invention that the level of the permitted maximum torque values is based on the robustness of the transmission of the power tool. The inventors have recognized that the tangential component of the acceleration of the side handle of the power tool also plays a role in the maximum torque. In the context of this invention, this tangential component of the acceleration is referred to as the so-called "level of pain" (LOP). It is preferred within the meaning of the invention that this acceleration component is used as a measure of the operating comfort of the power tool in the event of the tool of the power tool becoming blocked. The inventors have recognized that the level of pain is related to the maximum torque or its torque peaks. This relationship results in particular from the inertia of the power tool. There is therefore a relationship between the maximum permissible speed and the torque peaks within the power tool. Limiting the torque to values below an upper limit value therefore advantageously also limits the level of pain and improves the operating comfort of the power tool compared with conventional power tools, as are known from the prior art.

It is preferred within the meaning of the invention that the power tool has a transmission with a transmission ratio. The transmission ratio preferably results from the motor characteristic, i.e. the characteristic of the motor of the power tool. It is preferred within the meaning of the invention that the motor characteristic describes the lowest speed value at which the motor of the power tool can provide the required power. The transmission ratio is also reflected in particular in the time lag between the standstill of the tool and the standstill of the motor of the power tool if the tool of the power tool jams or blocks. For example, while the time period for the standstill of the tool lies in a range of 5 ms, the time period for the standstill of the motor of the power tool may lie in a range of 50 ms. The subject matter of the present invention is, in particular, the processes during the stated time periods after the tool of the power tool has jammed. These time periods are referred to as the second and third time periods in FIG. 1.

In the context of the present invention, it has been recognized in particular that the level of pain, the operating comfort and the maximum torque can depend on the motor parameters speed, rotor inertia and/or peak torque.

It is preferred within the meaning of the invention that an inertia of the power tool lies in a range from $30{,}000\cdot 10^{-6}$ to $70{,}000\cdot 10^{-6}$ kg·m$^2$, preferably in a range from $40{,}000\cdot 10^{-6}$ to $60{,}000\cdot 10^{-6}$ kg·m$^2$, particularly preferably in a range from $45{,}000\cdot 10^{-6}$ to $55{,}000\cdot 10^{-6}$ kg·m$^2$ and most preferably $50{,}000\cdot 10^{-6}$ kg·m$^2$. The values mentioned for the inertia of the power tool are preferably used as input variables for determining the motor parameters speed and motor inertia.

In addition, the power tool can have a spindle, with which a rotation of the motor is transmitted to the tool of the power tool. The speed of the spindle can lie in a range from 1,000 to 1,500 rpm, preferably 1,250 to 1,350 rpm and particularly preferably 1,300 rpm.

It is preferred within the meaning of the invention that the speed of the spindle corresponds to the speed of the tool of the proposed power tool. This means that the tool of the power tool preferably rotates at a speed in a range from 1,000 to 1,500 rpm, preferably in a range from 1,250 to 1,350 rpm and particularly preferably at a speed of approx. 1,300 rpm. The speed of the spindle or the speed of the tool of the power tool are coupled to the speed of the motor via the transmission ratio in the transmission, with the transmission ratio playing a key role for the effective moment of inertia.

In a second aspect, the invention relates to a method for operating a power tool. The power tool has a tool and a motor, with the motor of the power tool being operated in a speed range from 2,000 to 30,000 rpm and with an inertia of the motor lying in a range from $20\cdot 10^{-6}$ to $750\cdot 10^{-6}$ kg·m$^2$. The definitions, technical effects and advantages described for the proposed power tool apply analogously to the proposed operating method.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to produce useful further combinations.

Identical and similar components are denoted by the same reference signs in the figures, in which.

DETAILED DESCRIPTION

Figure 1:
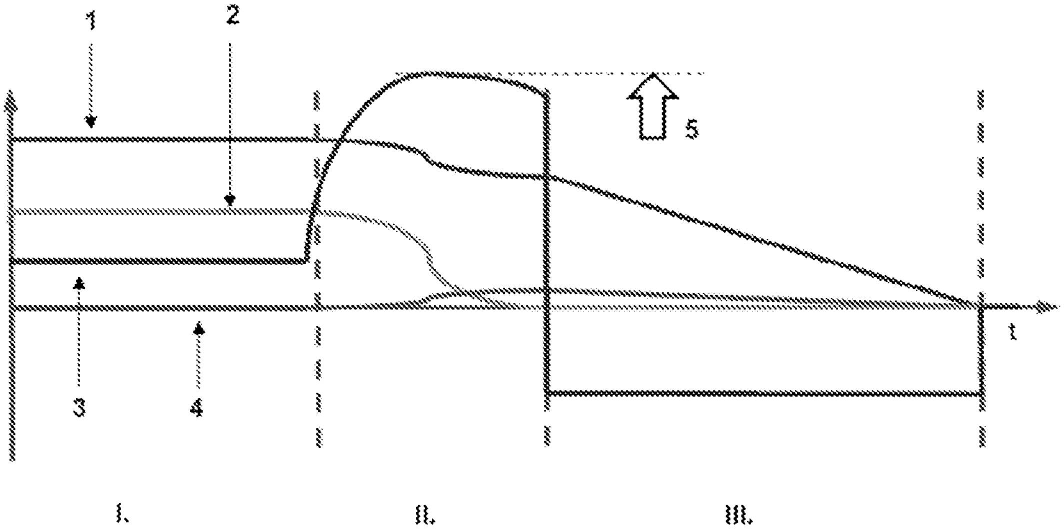
FIG. 1 shows exemplary curves of the speed of the motor, the speed of the tool, the torque and the speed of the device with respect to time t

FIG. 1 shows exemplary curves of the speed of the motor (1), the speed of the tool (2), the torque (3) and the speed (4) of the power tool (10) with respect to time t. The speed of the motor (1), the speed of the tool (2), the torque (3) and the speed (4) of the power tool (10) are plotted from top to bottom on the y-axis, while the time t is plotted on the x-axis. The overview is divided into three time ranges, which are described with Roman numerals I., II. and III. The first time period I. relates to the normal operation of the power tool (10), during which work is carried out with the power tool (10). In this first time period I., the values (1-4) illustrated in FIG. 1 are substantially constant, with such an approximately constant profile of the values (1-4) not excluding fluctuations and deviations around a mean value.

Figure 2:
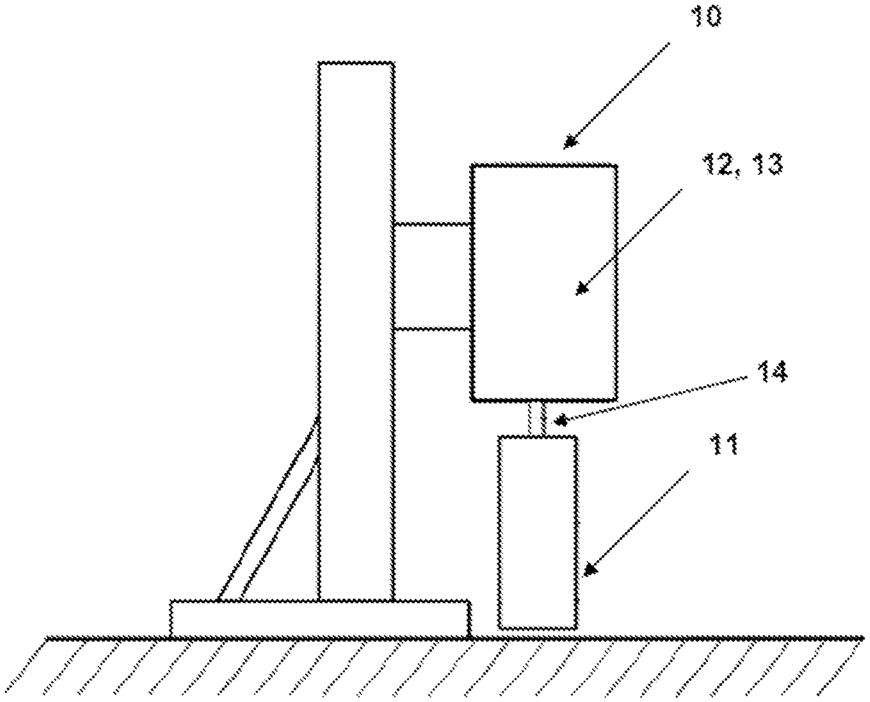
FIG. 2 shows an illustration of a preferred embodiment of a power tool, in particular a core drill

Details of the power tool (10) are illustrated by way of example in FIG. 2. If the power tool (10) is a core drill, for example cylindrical drill cores can be cut out of a solid substrate with the drill bit (11). The drill bit as a tool (11) of the power tool (10) is driven by a motor (12) of the power tool (10). The movement from the motor (12) to the tool (11) can be transmitted by means of a spindle (14). The power tool (10) can also comprise a transmission (13). In the exemplary embodiment of the invention that is illustrated in FIG. 2, the core drill (10) is fastened to a drill stand, although the invention can also be used in particular in hand-held power tools.

The second time period II. begins with the blocking of the tool (11) of the power tool (10). The start of the blocking of the tool (11) of the power tool (10) is illustrated in FIG. 1 with the first dashed, vertical straight line. In this second time period II., the speeds of motor (1) and tool (2) decrease, while the torque (3) rises sharply. The second time period II. lasts for example for 5 ms. The end of the second time period II. is determined by the tool (11) of the power tool (10) coming to a standstill. The motor (12) of the power tool (10) requires more time to be completely braked, with the standstill of the motor (12) of the power tool (10) determining the end of the third time period III. The time lag between standstill of the tool (11) and the motor (12) is determined by the transmission ratio of the transmission (13) of the power tool (10). Overall, in the context of the invention, there occurs an impulse shift from the tool (11) of the power tool (10) to the power tool (10) itself, with it being a concern of the invention that the impulse shift and a deflection of the power tool (10) are limited in such a way that no danger to the user of the power tool (10) emanates therefrom.

Approximately in the middle of the second time period II., the torque (3) assumes its highest value (5), which at the same time represents the upper limit (5) of the torque (3). This upper limit (5) of the torque (3) is indicated in FIG. 1 by the block arrow pointing upwardly at the top right in FIG. 1. A movement or deflection (4) of the power tool (10) itself can also occur in the middle of the second time period II. In the past, this deflection has led to injuries to the arms, shoulders or wrists of users of the power tool (10), which is why it is a concern of the present invention to minimize this deflection (4). It is preferred within the meaning of the invention that there occurs an impulse shift from the tool (11) of the power tool (10) to the power tool (10) itself, with it being a concern of the invention that the impulse shift and the associated deflection of the power tool (10) are limited in such a way that no danger to the user of the power tool (10) emanates therefrom. Another concern of the invention is that the torque (3) is always below the upper limit (5) for the torque (3). According to the invention, this is achieved in that the motor (12) of the power tool (10) is operated in a speed range (1) from 2,000 to 30,000 rpm and an inertia of the motor (12) of the power tool (10) lies in a range from $20\cdot10^{-6}$ to $750\cdot10^{-6}$ kg·m$^2$.

In the transition between the second time period II. and the third time period III., the power tool (10) or its drive begins to brake. As a result, the torque (3) decreases significantly in the third time period III. The transition between the second time period II. and the third time period III. is illustrated in FIG. 1 with the second dashed, vertical straight line. The speed (1) of the motor (12) of the power tool (10) also decreases in the third time period III., the decrease in motor speed (1) occurring approximately linearly until the motor (12) has come to a complete standstill at the end of the third time period III. The deflection (4) of the power tool (10) is also stopped in the third time period III. The third time period III. can last for example for 50 ms.

LIST OF REFERENCE SIGNS

1 Speed of the motor
2 Speed of the tool
3 Torque or load
4 Speed of the power tool
5 Upper limit of the torque
10 Power tool
11 Tool
12 Motor
13 Transmission
14 Spindle
I. Operation of the power tool
II. Time period in which the tool comes to a standstill in the event of a blockage
III. Time period in which the motor comes to a standstill in the event of a blockage

What is claimed is:

1. A power tool comprising:
a tool; and
a motor, the motor operable in a speed range from 2,000 to 30,000 rpm, with an inertia of the motor lying in a range from $20\cdot10^{-6}$ to $750\cdot10^{-6}$ kg·m$^2$;
wherein the power tool has no mechanical slip clutch;
wherein a torque in a drivetrain of the power tool does not exceed an upper limit value, the upper limit value for the torque lying in a range from 500 to 1,500 Nm;
wherein an inertia of the power tool lies in a range from $30{,}000\cdot10^{-6}$ to $70{,}000\cdot10^{-6}$ kg·m$^2$.

2. The power tool as recited in claim 1 wherein the upper limit value for the torque lies in a range from 700 to 1,000 Nm.

3. The power tool as recited in claim 2 wherein the upper limit value for the torque lies in a range from 850 to 950 Nm.

4. The power tool as recited in claim 3 wherein the upper limit value for the torque is 900 Nm.

5. The power tool as recited in claim 1 further comprising a transmission with a transmission ratio.

6. The power tool as recited in claim 1 wherein an inertia of the power tool lies in a range from $40{,}000\cdot10^{-6}$ to $60{,}000\cdot10^{-6}$ kg·m$^2$.

7. The power tool as recited in claim 6 wherein an inertia of the power tool lies a range from $45{,}000\cdot10^{-6}$ to $55{,}000\cdot10^{-6}$ kg·m$^2$.

8. The power tool as recited in claim 7 wherein an inertia of the power tool is $50{,}000\cdot10^{-6}$ kg·m$^2$.

9. The power tool as recited in claim 1 further comprising a spindle, a rotation of the motor being transmittable via the spindle to the tool of the power tool, with a speed of the spindle lying in a range from 1,000 to 1,500 rpm.

10. The power tool as recited in claim 9 wherein the speed of the spindle lies in a range from 1,250 to 1,350 rpm.

11. The power tool as recited in claim 10 wherein the speed of the spindle is 1,300 rpm.

12. A method for operating a power tool having a tool and a motor, the method comprising:
operating the motor of the power tool in a speed range from 2,000 to 30,000 rpm and with an inertia of the motor lying in a range from $20\cdot10^{-6}$ to $750\cdot10^{-6}$ kg·m$^2$;
wherein the power tool has no mechanical slip clutch;
wherein a torque in a drivetrain of the power tool does not exceed an upper limit value, the upper limit value for the torque lying in a range from 500 to 1,500 Nm;
wherein an inertia of the power tool lies in a range from $30{,}000\cdot10^{-6}$ to $70{,}000\cdot10^{-6}$ kg·m$^2$.

13. The power tool as recited in claim 1 wherein the power tool is a core drill.

14. The power tool as recited in claim 13 wherein the core drill is attached to a drill stand.

15. The method as recited in claim 12 wherein during a first time period the power tool is operated in a normal operation, in a second time period the power tool is blocked and comes to a standstill, the motor still moving and in a third time period after the second time period the motor comes to a standstill, the torque not exceeding the upper limit value in the first second and third time periods.

* * * * *